(12) United States Patent
Schoeny et al.

(10) Patent No.: US 10,980,169 B2
(45) Date of Patent: Apr. 20, 2021

(54) FLOW MONITORING AND ERROR DETECTION IN A MOBILE LIQUID AGRICULTURAL PRODUCT APPLICATOR

(71) Applicant: CNH Industrial America LLC, New Holland, PA (US)

(72) Inventors: Christopher Schoeny, Joliet, IL (US); Trevor Stanhope, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 54 days.

(21) Appl. No.: 16/227,306

(22) Filed: Dec. 20, 2018

(65) Prior Publication Data

US 2020/0196520 A1    Jun. 25, 2020

(51) Int. Cl.
*A01C 21/00* (2006.01)
*B05B 12/00* (2018.01)
(Continued)

(52) U.S. Cl.
CPC ............ *A01C 21/00* (2013.01); *A01C 23/047* (2013.01); *B05B 1/20* (2013.01); *B05B 12/008* (2013.01)

(58) Field of Classification Search
CPC ....... A01B 76/00; A01C 21/00; A01C 23/047; B05B 12/006; B05B 12/008; B05B 15/50
See application file for complete search history.

(56) References Cited

U.S. PATENT DOCUMENTS

| | | | |
|---|---|---|---|
| 5,911,362 A | 6/1999 | Wood et al. | |
| 7,162,961 B2 | 1/2007 | Grimm et al. | |

(Continued)

FOREIGN PATENT DOCUMENTS

| | | |
|---|---|---|
| CN | 201869551 U | 6/2011 |
| CN | 205305623 U | 6/2016 |
| WO | 2017/124175 A1 | 7/2017 |

OTHER PUBLICATIONS

A. Sharda, J.P. Fulton, T.P. Mcdonald. W.C. Zech, M.J. Darr. C.J. Brodbeck; Real-Time Pressure and Flow Dynamics Due to Boom Section and Individual Nozzle Control on Agricultural Sprayers; 2010; p. 1; American Society of Agricultural and Biological Engineers; St. Jeseph, Michigan; https://elibrary.asabe.org/abstract.asp?aid=34891.

*Primary Examiner* — Cody J Lieuwen
(74) *Attorney, Agent, or Firm* — Rebecca L. Henkel; Rickard K. DeMille

(57) ABSTRACT

An error detection and flow rate monitoring system of a liquid fertilizer distribution system of an agricultural implement that can provide feedback to identify compromised flow states in the system and corresponding locations of potential blockage or component failure. The system may include pressure sensors that may be evaluated in pairs or otherwise analyzed comparatively to determine flow rate or other characteristics through nozzle assemblies. The pressure sensors may be mounted in the wet boom between the rows. A control system compares the pressure values before and after each row to determine the pressure drop across its nozzle assembly and may further use the pressure drop values to determine flow or application rates and corresponding errors in the pressure drop, flow rate, and application rate compared to their acceptable values and may provide feedback to identify a specific location(s) of potential blockage or flow-control component failure.

9 Claims, 5 Drawing Sheets

(51) Int. Cl.
*A01C 23/04* (2006.01)
*B05B 1/20* (2006.01)

(56) References Cited

U.S. PATENT DOCUMENTS

| | | |
|---|---|---|
| 8,191,795 B2 | 6/2012 | Grimm et al. |
| 8,839,681 B2 | 9/2014 | Stewart et al. |
| 9,615,506 B2 | 4/2017 | Ruppert et al. |
| 9,781,916 B2 | 10/2017 | Preheim et al. |
| 2013/0008361 A1* | 1/2013 | Trevino ............... A01C 23/007 111/120 |
| 2014/0277780 A1* | 9/2014 | Jensen ................. B05B 12/085 700/283 |
| 2015/0257334 A1 | 9/2015 | Wolters et al. |
| 2015/0351375 A1* | 12/2015 | Ni ........................ A01M 7/005 239/1 |
| 2017/0086363 A1 | 3/2017 | Tribelhorn |
| 2020/0037519 A1* | 2/2020 | Wonderlich .......... B05B 12/085 |

\* cited by examiner

FLOW MONITORING AND ERROR DETECTION IN A MOBILE LIQUID AGRICULTURAL PRODUCT APPLICATOR

FIELD OF THE INVENTION

The subject matter disclosed herein relates generally to liquid fertilizer distribution systems of agricultural implements such as row-crop planters, seeders, strip-till tools, side dress toolbars, fertilizer applicators, and the like and, in particular, to a system for detecting error and monitoring flow rate of a liquid fertilizer distribution system of an agricultural implement to facilitate detecting system blockages and expedite initial liquid flow calibration.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, improved accuracy of in-row seed spacing, and improvements in making nutrients readily available to seeds. Modern farming practices also strive to minimize operating expenses. Ways of reducing operating expenses include operating the farm equipment at relatively faster speeds to reduce the amount of operating time to complete certain tasks and performing multiple tasks simultaneously to save extra passes in the field. One example is incorporating fertilizer delivery systems onto planters. These systems allow simultaneous fertilizing and planting and can provide in-furrow fertilization as a way of precisely managing nutrients with a constant delivery spacing between the fertilizer and seed to promote early emergence. Some planters with liquid fertilizer delivery systems have variable flow rate product delivery pumps that are controlled to adjust application rate of the liquid fertilizer. Application rate adjustments can be made during an initial liquid calibration process, which can be time-consuming. The initial liquid calibration process typically includes entering a target application rate, activating and running the system while capturing liquid delivered from the fertilizer tubes with measuring containers, and adjusting the system components based on differences between the amount of liquid fertilizer captured in the containers and the target volume for the given amount of run time. Although overall application rate can be adjusted, detecting flow-compromising blockages at specific locations during use can be challenging because of the way(s) that system performance is typically monitored. Application rate is typically indirectly monitored by evaluating certain cumulative or machine level criteria, such as overall flow rate and pressure within a manifold assembly that is downstream of the product delivery pump, but still within an overall upstream segment of the liquid product delivery system. Although this approach may indicate overall acceptability of flow rate and pressure values within the manifold assembly, at times, such acceptable values may not be indicative of appropriate product delivery characteristics at a per-row or even per-section basis. Even if unacceptable flow and/or pressure values are identified in the manifold assembly, these systems are typically unable able to provide feedback or identify which rows are not receiving the correct amount of product that would help diagnose potential blockage or component failure locations within the system. Attempts have been made to monitor flow at individual rows by implementing turbine-style flow meters. However, turbine-style flow meters have moving parts that can wear over time and can accumulate fertilizer or debris, which compromises their performance.

SUMMARY OF THE INVENTION

The present invention is directed to flow monitoring and error detection in a mobile liquid agricultural product applicator with an error detection and flow monitoring system of an implement's liquid fertilizer distribution system that can provide feedback to identify locations of potential blockage or component failure and can also expedite initial liquid flow calibration procedures. This may be done with pressure sensors that may be evaluated in pairs or otherwise analyzed comparatively to determine pressure drops and corresponding flow rate or other characteristics through a nozzle(s). Pressure sensors may be mounted in the wet boom between the rows and a control system compares the pressure values before and after each row to determine the pressure drop across its nozzle, the value of which is used to determine error(s) that corresponds to a compromised flow at a location within the system.

According to one aspect of the invention, the system may be configured for error detection on a per-row basis. A controller evaluates the appropriateness of each row unit's flow rate or detects an error at each row unit based on a pressure drop value across each row unit's nozzle. The controller determines the pressure drop value by comparing pressure values of a pair of pressure sensors in the wet boom for each row unit branch being evaluated, with a first pressure sensor mounted in the wet boom upstream of the wet boom's evaluated row unit branch and a second pressure sensor mounted in the wet boom downstream of the wet boom's evaluated row unit branch. With this comparison, the controller may identify a flow-compromised condition, such as a low-flow or no-flow condition that may correspond to, for example, a near-zero or zero pressure drop value across a nozzle at a particular row(s), indicative of little or no liquid fertilizer being delivered from the particular row unit's nozzle. The controller may send a user alert or other indication to the user of the detected error and/or flow-compromised condition at the specific row unit. This may provide in-use feedback and identify a specific per-row location of the flow disruption and, correspondingly, the location of the potential blockage or flow-control component failure.

According to another aspect of the invention, the system may be configured for error detection on a per-section basis instead of a per-row basis. Monitoring on a per-section basis may be achieved by mounting the pressure sensors between the boom sections, with the controller evaluating pressure drops across an entire section to determine whether the sections have adequate flow rates or if a sufficiently low pressure drop indicates potential blockage or other flow compromising condition that corresponds to, for example, a near-zero or zero pressure drop. The controller may send user alert or other indication to the user of the detected error and/or flow-compromised condition at the particular wet boom section. This may provide in-use feedback and identify a specific section of the flow disruption and its potential blockage or flow-control component failure, narrowing down a troubleshooting effort to a single section.

According to another aspect of the invention, the system may monitor liquid fertilizer flow rate characteristics during a planting session or an initial liquid flow calibration procedure. A user alert can provide in-use feedback of a possible compromised flow state of the respective nozzle assembly or section and its location during the planting session or initial liquid flow calibration procedure.

According to another aspect of the invention, a method of error detection and flow rate monitoring for a liquid fertilizer distribution system of an implement with multiple implement sections each having multiple row units for row-crop planting is provided. The liquid fertilizer distribution system includes a wet boom system that conveys the liquid fertilizer along the implement for delivery toward furrows. The wet boom system includes wet boom row unit branches with nozzle assemblies and row unit fertilizer tubes that extend from the nozzle assemblies along the respective multiple row units to deliver the liquid fertilizer toward the furrows at the row units. Liquid fertilizer flow characteristics of at least one wet boom segment, such as rows and/or sections of the wet boom system, are monitored based on pressure characteristics within the wet boom system. For the segment(s) of the wet boom system, a pressure drop value within the respective segment of the wet boom system is evaluated. The pressure drop value is compared to an acceptable pressure drop value. A compromised flow state or an acceptable flow state is determined based on the comparison of the pressure drop value to the acceptable pressure drop value.

According to another aspect of the invention, when a flow-compromised nozzle assembly is identified, a section control valve associated with the wet boom section that includes the flow-compromised nozzle assembly may be adjusted to reduce a discrepancy between the nozzle pressure drop value and the acceptable nozzle pressure drop value. Adjustment of a section control valve may also be adjusted to make per-section adjustments when entire sections are monitored instead of individual rows.

According to another aspect of the invention, during an initial liquid flow calibration procedure, a lowest-flow nozzle assembly in each of the multiple wet boom sections is identified. The pressure drop value of the lowest-flow nozzle assembly in each of the multiple boom sections is compared to a corresponding acceptable pressure drop value to determine a compromised or acceptable flow state of the lowest-flow nozzle assembly. If the lowest-flow nozzle assembly of a respective wet boom section defines a compromised flow state, then a control system adjusts the section control valve associated with the respective wet boom section, for example, until the lowest-flow nozzle assembly defines the acceptable flow state or is within an acceptable flow range.

According to another aspect of the invention, at each row unit, a flow error is evaluated as a function of a pressure drop across the respective nozzle assembly. Upstream and downstream pressures relative to the wet boom row unit are evaluated to establish a pressure drop value for the respective nozzle assembly. An unacceptable flow error condition or an acceptable flow condition for the respective nozzle assembly is determined based on the pressure drop value, and a user alert may be generated and conveyed to the user, if there is an unacceptable flow error condition.

According to another aspect of the invention, an implement is provided with multiple implement sections. The implement may be or include a planter for row-crop planting, a seeder, a fertilizer applicator, strip-till tools, side dress toolbars, or the like, which may define multiple implement sections. The planter or other implement has a liquid fertilizer distribution system for distributing liquid fertilizer toward furrows and includes a tank assembly with at least one bulk liquid fertilizer tank that stores a volume of liquid fertilizer. A manifold assembly receives liquid fertilizer from the tank assembly and has section control valves that deliver the liquid fertilizer toward the row units at adjustable rates. A wet boom system includes wet boom sections that correspond to the planter or other implement sections and includes manifold outlet tubes that extend from and carry liquid fertilizer away from the multiple section control valves toward the multiple wet boom sections. Each of the wet boom sections includes a wet boom main tube that is connected to a respective manifold outlet tube. The wet boom main tubes are arranged at the planter or other implement sections and at least partially define the wet boom sections. Wet boom row unit branches have nozzle assemblies and row unit fertilizer tubes that extend from the nozzle assemblies along the row units to deliver the liquid fertilizer toward the furrows. An error detection and flow rate monitoring system includes pressure sensors that are configured to detect pressures within the wet boom system. The pressure sensors are arranged between the wet boom row unit branches. A control system is configured to determine pressure drop values across nozzle assemblies. This may be done by comparing pressure values of a pair of pressure sensors in the respective wet boom main tube that are upstream and downstream of the respective wet boom row unit branch. The control system may compare a pressure drop of the nozzle assembly at the wet boom row unit branch with an acceptable pressure drop value to determine whether its flow is acceptable or compromised. If the control system determines that the flow is compromised, it may generate and convey a user alert.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION

Figure 1:
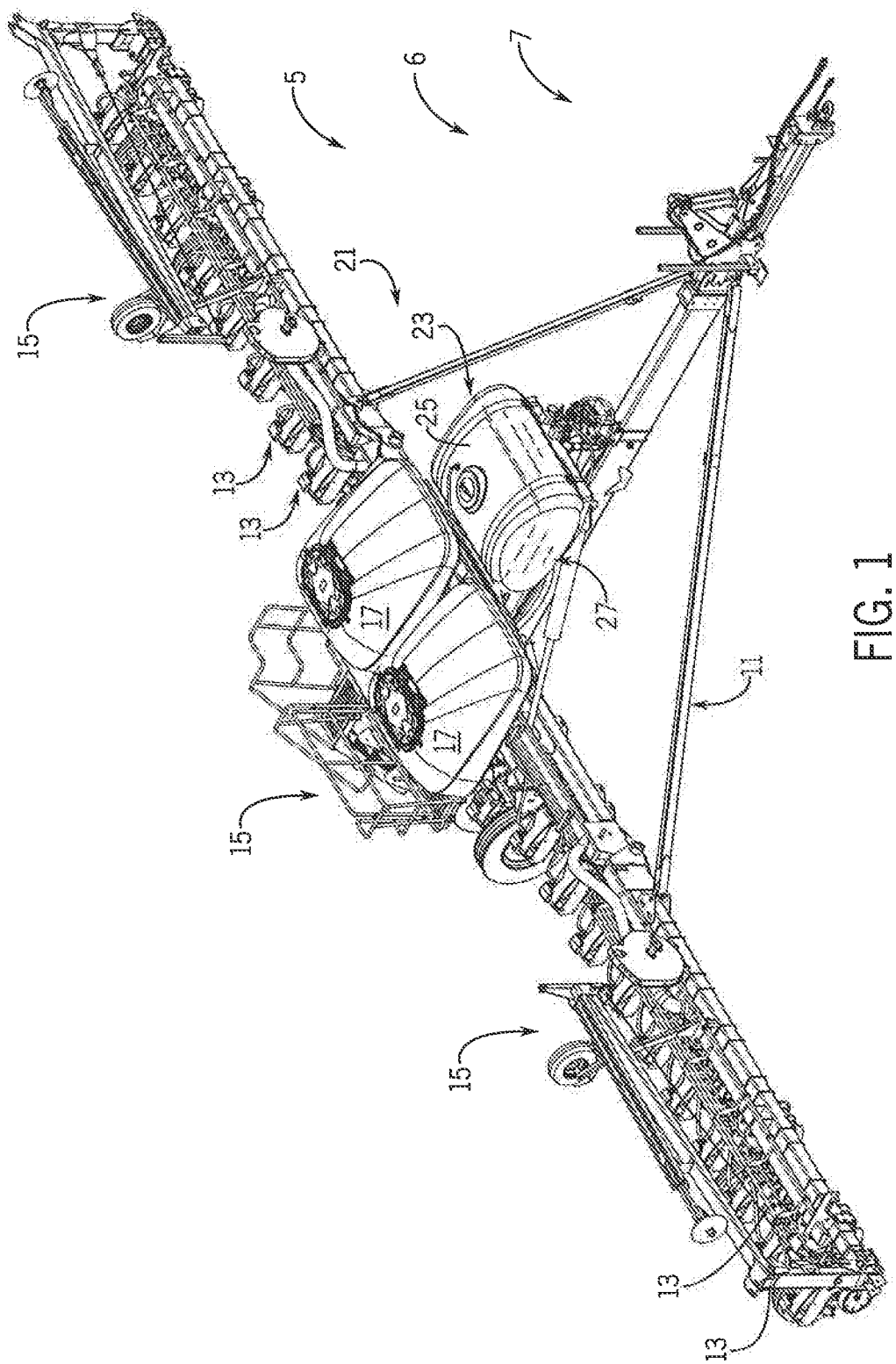
FIG. 1 is an isometric view of an implement shown as a planter that incorporates an error detection and flow rate monitoring system of a liquid fertilizer distribution system of a planter in accordance with the present invention.

Referring now to the drawings and specifically to FIG. 1, an error detection and flow monitoring system is shown as system 5 that can provide feedback to identify locations of potential blockage or component failure and can also expedite initial liquid flow calibration procedures.

System 5 is incorporated in an implement 6 with a liquid fertilizer system as a mobile liquid agricultural product applicator. Implement 6 may be, for example, a planter, a seeder, a strip-till tool, and a side dress toolbar or other fertilizer applicator(s). The exemplary implement 6 represented here is shown as a planter 7, which may be one of the EARLY RISER® series planters available from Case IH and is typically pulled by a traction device such as a tractor. A frame 11 of the planter 7 supports multiple row units 13 that are substantially identical within planter sections 15. Planter sections 15 are shown here as a center section with a pair of wing sections or outer sections arranged transversely outward of the center section and are configured to fold forward to convert the planter 7 to a transport width. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the closed furrow and to further firm the soil over the seed to promote favorable seed-to-soil contact. Seed is held in a seed storage system which may be a bulk seed storage system, shown here as a central bulk storage system with a pair of bulk fill hoppers 17 supported by the frame 11 of the planter 7, remote from the row units 13. A seed conveyance system such as a pneumatic seed conveyance system delivers the seed from the bulk fill hopper(s) 17 to the row units 13 for singulation and delivery to the furrow with a seed meter system which may include, for example, mechanical or pneumatic seed meters. Each seed meter delivers the singulated seeds to the furrow through a seed delivery system, which may include a seed tube or a fluted belt.

Figure 2:
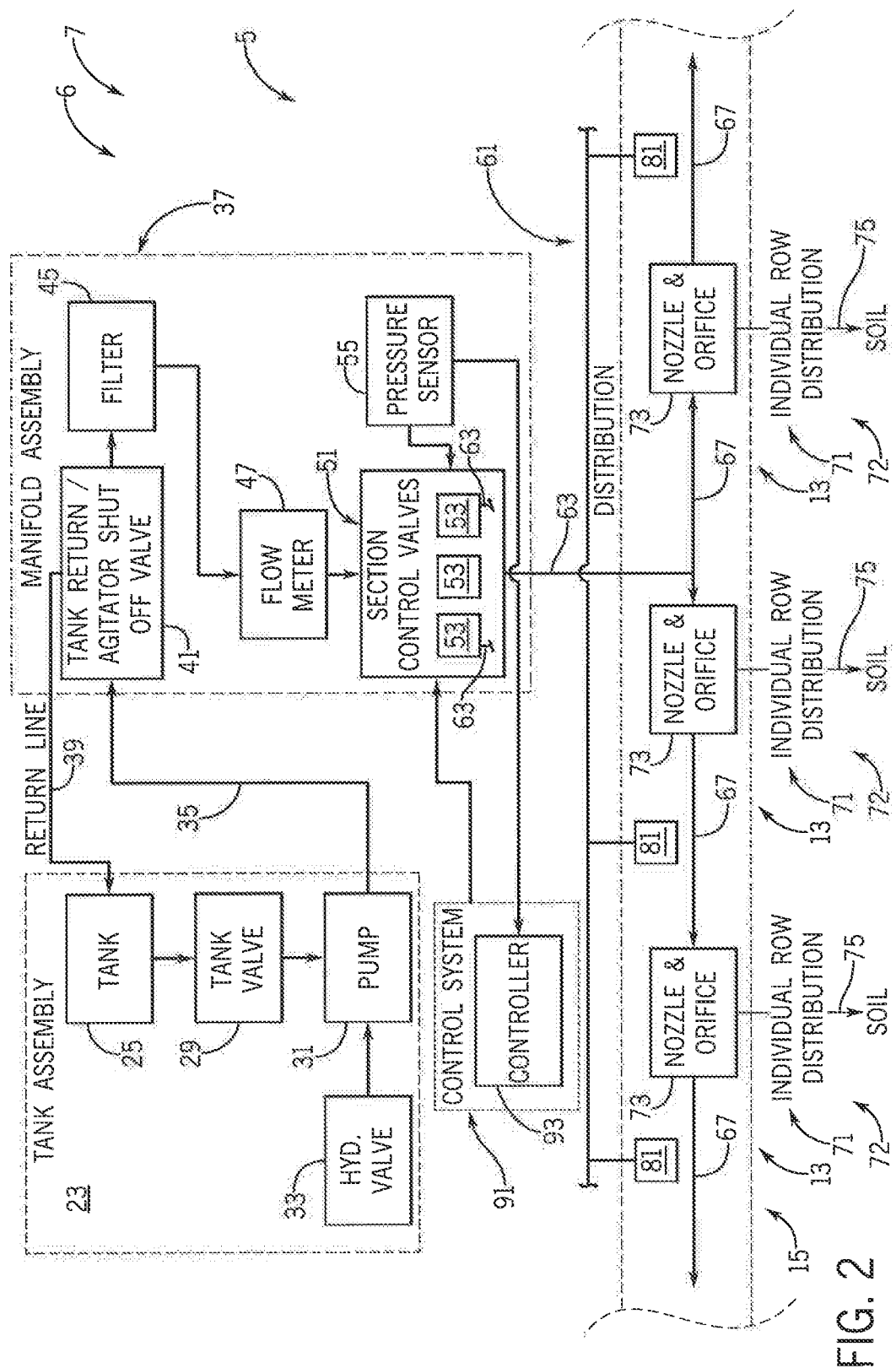
FIG. 2 is a simplified partially schematic top plan view of a portion of the planter of FIG. 1 incorporating an error detection and flow rate monitoring system of the present invention.

Still referring to FIG. 1, system 5 is used with liquid fertilizer distribution system 21 that is supported by the planter frame 11. Liquid fertilizer distribution system 21 has a tank assembly 23 with at least one bulk liquid fertilizer tank 25 that centrally stores a volume of liquid fertilizer 27. Referring now to FIG. 2, tank assembly 23 may include tank valve 29 that selectively permits flow of the liquid fertilizer 27 (FIG. 1) out of the tank 25 to pump 31. Pump 31 may be a variable speed centrifugal pump that is controlled by a hydraulic valve 33 to adjust its RPM (rotations per minute) speed and output flow rate to deliver the liquid fertilizer at a variable flow rate through a pump output line 35 to a manifold assembly 37, which may return at least some of the liquid fertilizer 27 (FIG. 1) to tank 25 through tank return line 39 depending on delivery and application rates.

Still referring to FIG. 2, within manifold assembly 37, tank return/agitator shut off valve 41 is connected to both the pump outlet and tank return lines 35, 39. Within the manifold assembly 37, various components are connected to each other to define a common flow path for liquid fertilizer in series through, for example, the tank return/agitator shutoff valve 41, filter 45, flow meter 47, to a sectional control valve assembly 51 with sectional control valves 53 and a manifold assembly pressure sensor, shown as pressure sensor 55. The number of sectional control valves 53 in the control valve assembly 51 and manifold assembly 37 corresponds to the number of planter sections 15, with each sectional control valve 53 delivering liquid fertilizer 27 (FIG. 1) to a respective planter section 15 at a variable rate, which is controlled by adjusting the sectional control valve(s) 53. Within manifold assembly 37, manifold pressure sensor 55 detects pressure immediately downstream of the sectional control valve assembly 51 and, therefore, the pressure at each of the sectional control valves 53.

Still referring to FIG. 2, the sectional control valves 53 deliver the liquid fertilizer 27 (FIG. 1) to a wet boom system 61, which has manifold outlet tubes 63 that extend from the section control valves 53 to deliver liquid fertilizer 27 (FIG. 1) toward the multiple planter sections 15. Manifold outlet tubes 63 may have relatively large diameters, such as ¾ inch ID (inside diameter). At each planter section 15, a respective manifold outlet tube 63 feeds a wet boom main tube 67. Like manifold outlet tubes 63, wet boom main tubes 67 may have relatively large diameters, such as ¾ inch ID. Wet boom row unit branches 71 are supported by the planter row units 13 and are therefore transversely spaced from and parallel to each other, in series or in upstream/downstream relationship with respect to each other relative to their positions at the wet boom main tube 67. Wet boom row unit branches 71 extend from and are fluidly connected to the wet boom main tube 67 at the respective planter section 15. One or more of the rows, such as one or more of the row unit branches 71, defines a wet boom section 72 that can be individually monitored and/or controlled. Accordingly, each wet boom section 72 may correspond to one row unit branch 71 at a single row unit 13 or more than one row unit branch 71 at their respective row units 13 to allow individual row control or simultaneous control of more than one row unit branch 71. When a wet boom section 72 has more than one row unit branch 71, the multiple row wet boom section 72 may have fewer row unit branches 71 than the number in the planter section 15 or the multiple row wet boom section 72 may be defined by all of the row unit branches 71 in the respective planter section 15, or some other combination of multiple row unit branches 71. This allows monitoring and/or control per row unit branch 71 and row unit 13 as well as simultaneous control of different groups of row unit branches 71 and row units 13 by controlling the wet boom section(s) 72. The particular number of row unit branches 71 within a wet boom section 72 may be based on, for example, the control resolution of a particular system 5. Regardless of the particular number of rows in each wet boom section 72, each of the wet boom row unit branches 71 has a nozzle assembly 73, which may provide the connection mechanism between the wet boom main tube 67 and the wet boom row unit branch 71. The nozzle assembly 73 may include a nozzle body that may include a clamp-style mount that clamps around the wet boom main tube 67 to secure the nozzle body against the wet boom main tube 67 with a nozzle body inlet tube extending through a hole in the wet boom main tube 67 to fluidly connect the nozzle body with the wet boom main tube 67. Nozzle assembly 73 includes an orifice which may be defined by a replaceable orifice disk that allows different disks with different size openings to be installed in the nozzle assembly 73 to change flow rate through the nozzle assembly 73. A cap may secure the orifice disk with respect to the nozzle body and provide a mounting structure against which row unit fertilizer tubes 75 are mounted and extend away from the nozzle assemblies 73. Row unit fertilizer tubes 75 extend along the row units 13 and deliver the liquid fertilizer 27 (FIG. 1) toward the furrows. Row unit fertilizer tubes 75 have substantially smaller diameters than the manifold outlet tube 63 and wet boom main tubes 67, such as ¼ inch ID. The row unit fertilizer tubes 75 may be sufficiently long and/or have cooperating components such as rubber in-furrow boots to provide in-furrow fertilization.

Still referring to FIG. 2, the system 5 is configured to detect flow errors such as blockages or failures of flow-controlling components and monitor flow of the planter's liquid fertilizer distribution system 21. Flow through the liquid fertilizer distribution system 21 can degrade for a variety of reasons, including partial or complete plugging or clogging that creates corresponding blockages from accumulation of fertilizer or its solid constituents or other residue in the liquid fertilizer distribution system 21, as well as situations in which the wrong orifice is installed in the nozzle assembly 73, which could create a failure condition. Such accumulation is more likely to occur in the relatively small passages and other openings in the row unit fertilizer tubes 75, orifices and other segments of the nozzle assemblies 73, and elsewhere in the wet boom row unit branches 71. Other flow degradation or blockages may result from flow-controlling component failure, such as failure of solenoids or other actuators that control shutoff or other valves within the liquid fertilizer distribution system 21, including shutoff valves or features of the sectional control valves 53 and shutoff valves or features of the nozzle bodies of the nozzle assemblies 73. The system 5 looks for flow errors that correspond to lower than expected pressure drops or no pressure drops, where there should be higher pressure drops in the liquid fertilizer distribution system 21 due to appropriate loss of liquid volume through the wet boom row unit branches 71 during normal operating conditions and fertilizer delivery.

Still referring to FIG. 2, the system 5 includes pressure sensors such as wet boom pressure sensors 81 that are configured to detect pressures within the wet boom system 61. Control system 91 evaluates pressure characteristics such as pressure drops by evaluating signals from pairs of wet boom pressure sensors 81 to determine pressure drops and corresponding application rate, flow rate, or other flow characteristics through segments of the wet boom system 61, such as wet boom sections 72, which may be defined by the individual wet boom row unit branches 71 and their respective nozzle assemblies 73. FIG. 2 shows a wet boom pressure sensor 81 between pairs of row units 13 and wet boom row unit branches 71, whereby each of the wet boom row unit branches 71 has a first wet boom pressure sensor 81 arranged upstream of it and a second wet boom pressure sensor 81 arranged downstream of it. Exceptions are the upstream most wet boom row unit branches 71, each of which has a wet boom pressure sensor 81 downstream of it and the manifold pressure sensor 55 upstream of it. Accordingly, each of the wet boom row unit branches 71 has some pair of pressure sensor(s) 55, 81 that can measure pressure(s) both upstream and downstream of it with respect to its position on the wet boom main tube 67 for determining a pressure differential or pressure drop across the row unit branch 71, indicating a pressure drop across and a flow characteristic through respective nozzle assembly 73. This arrangement allows for row by row or per-row error detection and flow rate monitoring. This arrangement can also allow section by section or per-section error detection and flow rate monitoring by evaluating a select number of the pressure sensor(s) 55, 81 upstream and downstream of the respective section(s), or fewer pressure sensor(s) 55, 81 can be provided, such as only those between sections as another way to allow for per-section error detection and flow rate monitoring.

Still referring to FIG. 2, each wet boom pressure sensor 81 is shown here mounted to wet boom main tube 67. This may be done by way of a T-fitting or other hardware that mounts the wet boom pressure sensor 81 to expose its port or other appropriate component to the liquid fertilizer 27 (FIG. 1) in a manner that allows it to obtain a pressure reading of the liquid fertilizer 27 (FIG. 1). The pressure sensor(s) 55, 81 may be diaphragm-style pressure sensors that may not require fertilizer to flow through them or other configurations, such as venturi-style sensors that may require fertilizer to flow through them. Regardless of the particular configuration of the sensor(s) implemented as pressure sensor(s) 55, 81, the arrangement of the wet boom pressure sensors 81 between adjacent wet boom sections 72, which may be defined by the individual wet boom row unit branches 71, allows each of the wet boom pressure sensors 81 to act as either a reference/upstream pressure sensor or a compared/downstream pressure sensor, depending on which of the wet boom sections 72 is being evaluated by control system 91. Control system 91 includes a power supply and controller 93 that can include an industrial computer or, e.g., a programmable logic controller (PLC), along with corresponding software and suitable memory for storing such software and hardware including interconnecting conductors for power and signal transmission for detecting states or characteristics within the error detection and flow monitoring system 5, including flow meter 47, manifold pressure sensor(s) 55, boom pressure sensor(s) 81 as well as controlling electronic, electro-mechanical, and hydraulic components of the system 5, including pump 31, hydraulic valve 33, and sectional control valves 53, and may communicate with or control other components of the planter 7. An interface system is operably connected to the controller 93 and includes a monitor and various input devices as an HMI (human machine interface) to allow an operator to see the statuses and control various operations of the system 5 from within the cab of the tractor, including inputting information for controlling system 5 and receiving user alerts from control system 91. The interface system may be an AFS Pro 700 display incorporating an AccuStat system, available from Case IH.

Figure 3:
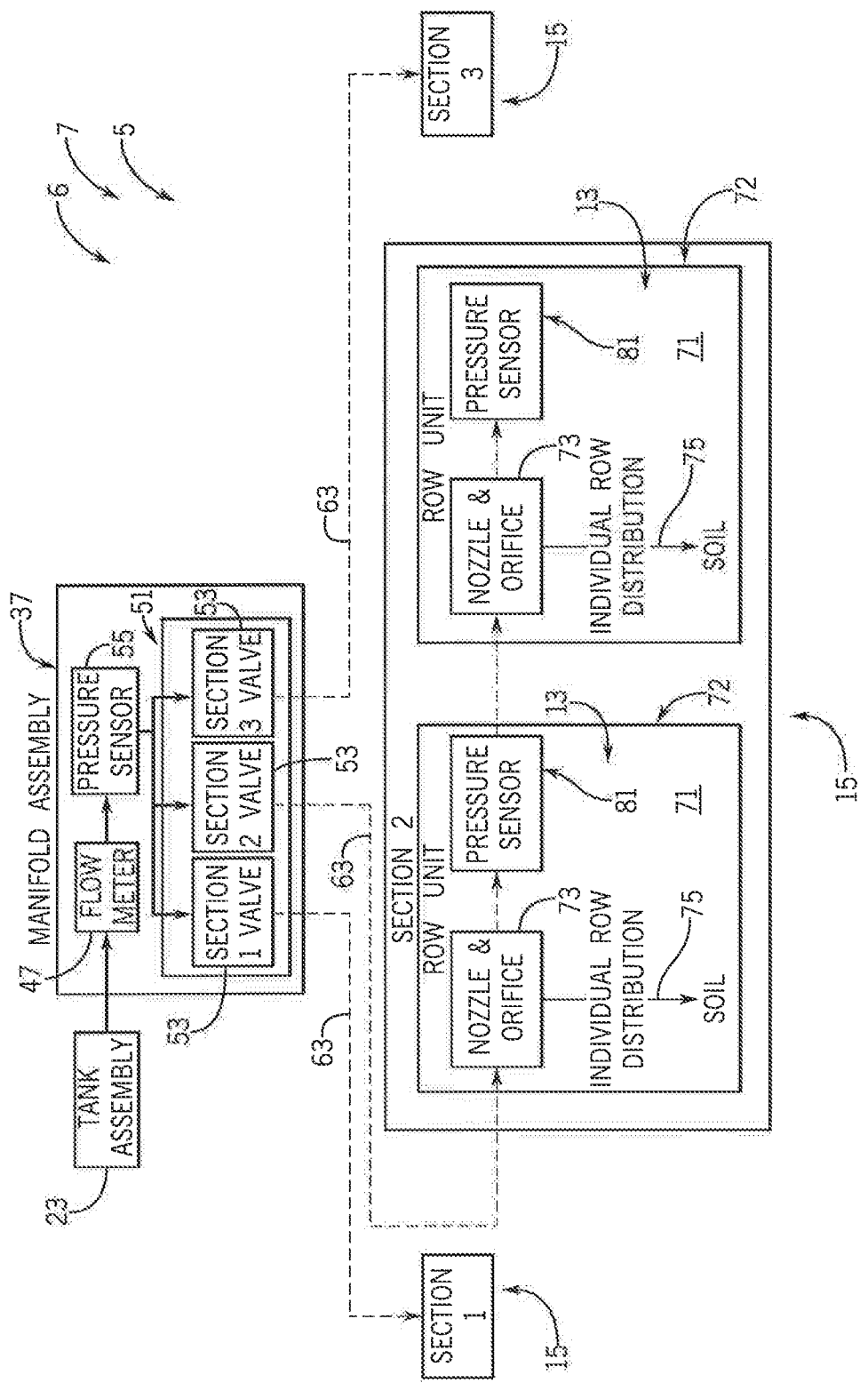
FIG. 3 is a variant of the simplified partially schematic top plan view of a portion of the planter of FIG. 1 incorporating an error detection and flow rate monitoring system of the present invention.

Referring now to FIG. 3, system 5 is substantially the same as that shown in FIG. 2, whereby that description is applicable here with respect to system 5 of FIG. 3. Compared to that of FIG. 2, the system shown in FIG. 3 is represented as simplified in some ways, including that it does not show the control system 91 and the tank assembly 23 is shown in a more simplified form. Manifold pressure sensor 55 is arranged between flow meter 47 and control valve assembly 51 instead of downstream of all the sectional control valves 53 as in FIG. 2. FIG. 3 schematically represents additional planter sections 15 that receive liquid fertilizer through manifold outlet tubes 63 toward the left and right sides of the system 5. It is understood that although FIGS. 2 and 3 respectively show three and two row units 13 and wet boom row unit branches 71, each planter section 15 may have other numbers of row units 13 and wet boom row unit branches 71 such as four or more row units 13 and wet boom row unit branches 71 depending on the particular configuration of planter 7.

Figure 4:
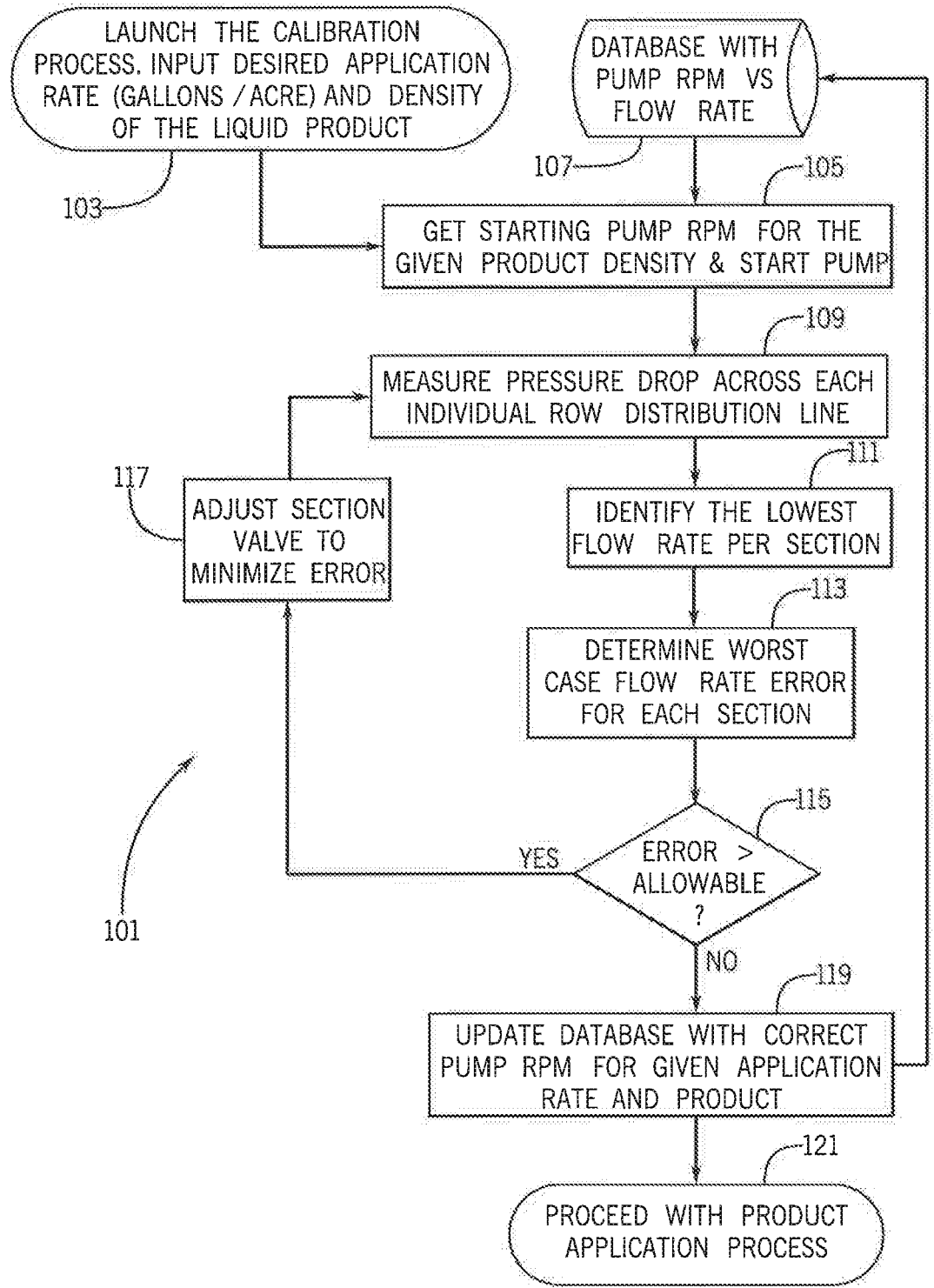
FIG. 4 is a flowchart of an initial liquid flow calibration procedure in accordance with the present invention.

Referring now to FIG. 4 and with background reference to FIG. 2 to refer to various system components, an exemplary liquid calibration procedure is shown, represented as method 101. As an initial step represented at block 103, the liquid calibration procedure is launched through the interface system of control system 91 and the user enters various operating parameters, such as a desired application rate, for example, in terms of gallons per acre, and a density value for the liquid fertilizer being used. As represented at block 105, based on the entered rate and/or density information, the control system determines a starting pump speed, for example, an RPM value retrieved from a database with pump RPM and flow rate values at block 107 and commands energization of the pump to start rotating its impeller at block 105. As represented at block 109, pressure drop is measured across each individual row unit branch 71. The control system 91 does this by evaluating signals of the pressure sensors 55, 81 and comparing appropriate pairs of pressure sensors 55, 81 on opposite sides of each of the row unit branches 71 to determine the pressure drop across each row unit branch 71. Block 111 shows control system 91 identifying the lowest flow rate in each of the wet boom sections 72. In multiple row wet boom sections 72, the lowest flow rate per section 72 corresponds to the smallest pressure drop across a respective row unit branch 71 compared to the other row unit branches 71 in the particular wet boom section 72, with lower pressure drops indicating lower flow through a row unit branch 71. A row unit branch's 71 flow rate error may be defined by a comparison of a target flow rate stored in the control system's 91 memory or compared to an average flow rate within the wet boom section 72. This may be done by referring to a database or lookup table stored in memory or with reference to some other predetermined stored or accessible value based on the desired application rate and density of the liquid fertilizer or may be calculated by averaging the observed pressure drops and identifying any outliers with respect to the average pressure drop for wet boom section 72. As represented at block 113, control system 91 determines a worst-case flow rate error for each wet boom section 72, which corresponds to the flow rate error of the row unit branch 71 that has the smallest pressure drop across it. At block 115, the worst-case flow rate error is evaluated to see if it is allowable. In this way, the control system 91 determines if the evaluated pressure drop and flow rate provide unacceptable flow error condition and a compromised flow state or an acceptable flow state for the particular row unit branch 71. At block 115, if the error is greater than allowable so the row unit branch 71 has an unacceptable flow error condition and a compromised flow state, then at block 117, the control system 91 commands an adjustment to the sectional control valve 53, for example, to increase flow to the particular wet boom system 61. The procedure continues through the loop of measuring the pressure drop at block 109, identifying the lowest flow rate in the section at block 111, determining a worst-case flow rate error for the section at block 113, determining whether the amount of error is allowable at block 115, and further adjusting the sectional control valve 53 at block 117, if needed. When the worst-case flow rate error for the section is allowable to provide an acceptable flow condition and an acceptable flow state for the particular row unit branch 71, then the loop is exited. At block 119, if adjustments or corrections were made to pump RPM, the database is updated with the corresponding updated or corrected information for the pump RPM needed for the given application rate and liquid fertilizer product. If no database update is needed, then at block 121, control system 91 ends the initial liquid calibration procedure and allows the system 5 to proceed with the application process during a planting session.

Figure 5:
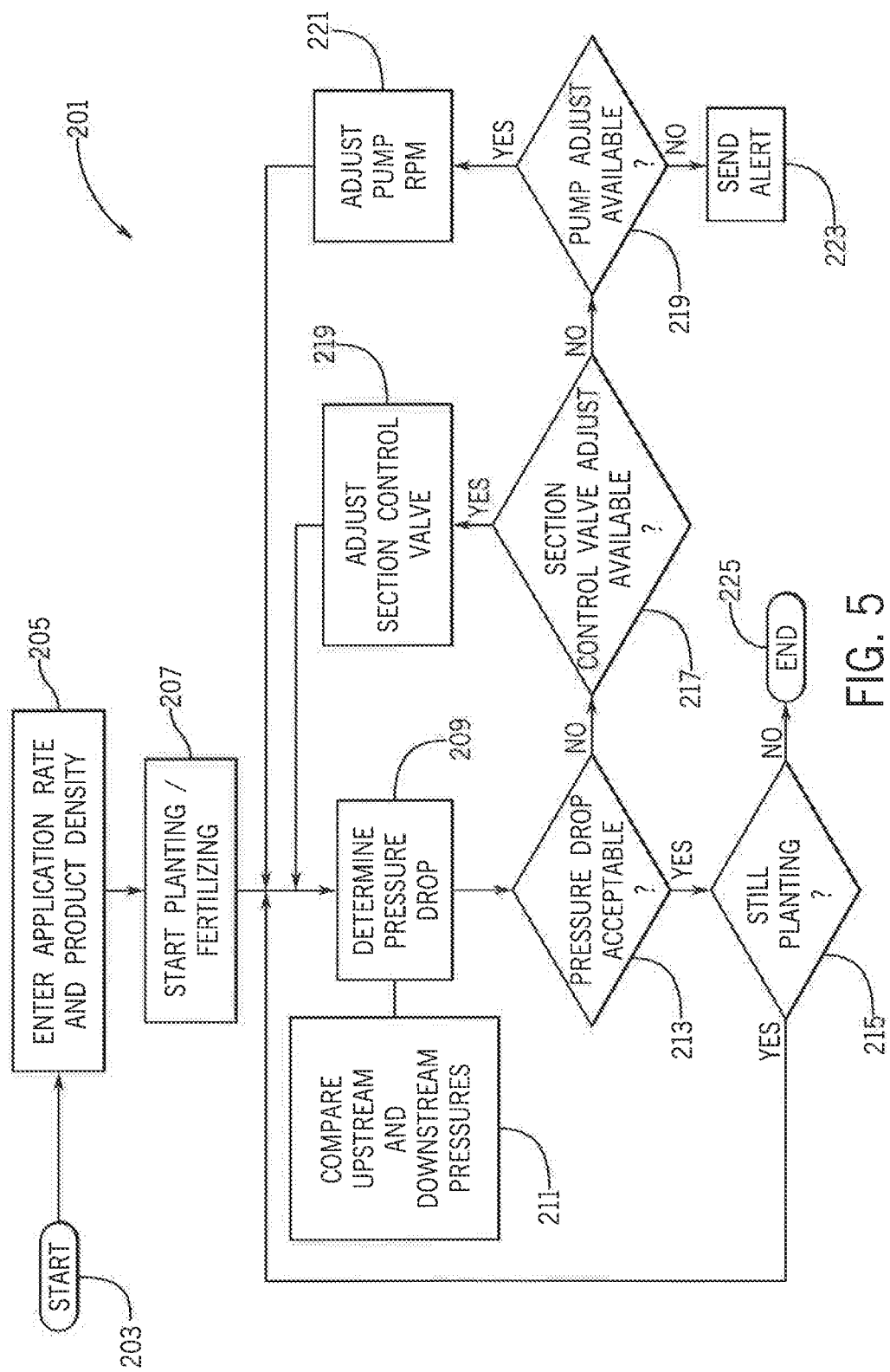
FIG. 5 is a flowchart of an in-use flow error reduction procedure in accordance with the present invention.

Referring now to FIG. 5 and with background reference to FIG. 2 to refer to various system components, an exemplary automatic on-the-fly monitoring and flow error correction procedure is shown, represented as method 201. The method 201 allows the system 5 to automatically self-regulate to reduce flow rate errors by adjusting upstream flows, for example, by adjusting flow through one or more of the sectional control valves 53 and/or delivery rate from pump 31, so long as the adjustments to upstream flow can be made in a manner that is compatible with the overall target application rate for the planting/fertilizing session. As an initial step represented at block 203, the user starts the liquid fertilizer delivery program for simultaneous planting and fertilizing. As represented at block 205, the user enters or inputs information into the system such as product application rate and density. Based on the inputted information, the control system 91 controls system components such as commanding rotation of the pump 31 at a certain RPM value, which may be retrieved from a database. During the planting/fertilizing session, control system 91 may continuously monitor flow rate and identify flow errors that correspond to observed pressure drop values compared to target or expected pressure drop values. At blocks 207, 209, and 211, the planting/fertilizing session begins and the control system 91 determines pressure drops at various locations within the system, such as at each row unit branch 71, by comparing pairs of pressure values from pressure sensors 55, 81 immediately upstream and downstream of the respective row unit branch 71. As represented at block 213, control system 91 determines whether each pressure drop and/or its flow error is acceptable or unacceptable. If the pressure drop and/or its flow error is acceptable and, if the planting/fertilizing session is still underway as shown at block 215, then control system 91 continues to determine pressure drops and their acceptability at blocks 209, 211, and 213. If the pressure drop is not acceptable, then the control system 91 tries to correct the flow error by adjusting system components. At block 217, control system 91 evaluates whether the respective sectional control valve 53 can be adjusted to increase flow to the section with the unacceptable flow error to try to increase flow through the flow-compromised row unit branch 71. If the control system 91 determines that the respective sectional control valve 53 can be further adjusted to increase flow at the section, then the flow-increasing adjustment is made, as represented at block 219 and then control system 91 continues to determine pressure drops and their acceptability at blocks 209, 211, and 213. If at block 217 the control system 91 determines that the sectional control valve 53 cannot be adjusted further, then the control system 91 determines whether the pump 31 can be controlled to increase its output to increase flow, as represented at block 219. If the control system 91 determines that the pump 31 can be further adjusted to increase flow, then the flow-increasing adjustment is made, as represented at block 221 and then control system 91 continues to determine pressure drops and their acceptability at blocks 209, 211, and 213. If at block 219 the control system 91 determines that the pump 31 cannot be adjusted to further increase product flow, for example, not while maintaining an acceptable overall application rate across all sections, then at block 223 the control system 91 generates and sends a user alert. The user alert may be, for example, an audible tone accompanied by a visual indication of a flow error or blockage condition through the interface system. The visual indication may further include specific location information of the blockage, such as identifying the wet boom section 72, which may be defined by a single row unit branch 71, that exhibits a flow-compromised state. Once all pressure drops are acceptable then planting/fertilizing session continues while the control system 91 continues to monitor the flow rate until the planting/fertilizing session is done at block 215, at which point the program ends at block 225.

Although the exemplary methods 101 and 201 were described with automatic self-flow error-reducing adjustments within the system, system 5 may instead perform the same types of error detection and flow rate monitoring without automatic adjustments, but instead only sending alerts which may include location of the potential blockage or other flow compromising condition. Also, although described in terms of error detection and flow monitoring mostly through single row wet boom sections 72 defined by single row unit branches 71 during initial liquid flow calibration and during use, the same approach can be used for error detection and flow monitoring through other segments of the wet boom system 61, such as multiple row wet boom sections 72, by evaluating corresponding pressure sensors 55, 81 upstream and downstream of the particular row groups or row unit branches 71 within the wet boom section 72, instead of individual row unit branches 71. Although implement 6 is described mostly as a planter 7, the same concepts and features of system 5 and control methodologies apply in the same way(s) to other implements 6, such as a seeder, a strip-till tool, a fertilizer applicator, a side dress toolbar, or others, with a liquid fertilizer system(s).

Many changes and modifications could be made to the invention without departing from the spirit thereof. The scope of these changes will become apparent from the appended claims.

We claim:

1. A method of flow monitoring, and error detection in a mobile liquid agricultural product applicator by detecting errors and monitoring flow rate for a liquid fertilizer distribution system of an agricultural implement with multiple implement sections, wherein the liquid fertilizer distribution system includes,
    a manifold assembly comprising a manifold pressure sensor and a plurality of sectional control valves,
    a wet boom system that conveys the liquid fertilizer along each implement section via a wet boom main tube for delivery toward furrows, the wet boom system including multiple wet boom sections connected to each implement section of the multiple implement sections, each wet boom section including a row unit including a nozzle assembly and a row unit fertilizer tube that extends from each nozzle assembly, each wet boom section connected to the wet boom main tube; a plurality of wet boom pressure sensors, wherein a respective wet boom pressure sensor is arranged downstream of each wet boom section, each wet boom pressure sensor of the plurality of wet boom pressure sensors connected to at least one other wet boom pressure sensor or to the manifold pressure sensor in the manifold assembly, each wet boom section configured to deliver the liquid fertilizer toward the furrow formed by the row unit of each wet boom section, the multiple wet boom sections of an implement section of the multiple implement sections corresponding to a respective sectional control valve of the plurality of sectional control valves that is adjustable to regulate flow of the fertilizer to each wet boom section of the multiple wet boom sections of the respective implement section,
    wherein the wet boom section arranged at the most upstream position of the wet boom main tube will have the manifold pressure sensor arranged at an upstream side and a wet boom pressure sensor at a downstream side, and wherein each of the remaining wet boom sections will have a wet boom pressure sensor arranged at an upstream side and another wet boom pressure sensor arranged at a downstream side, such that each wet boom section has a respective pair of pressure sensors comprising an upstream pressure sensor and a downstream pressure sensor;
    the method comprising:
        monitoring liquid fertilizer flow characteristics of each wet boom section of the multiple wet boom sections in each implement section of the multiple implement sections of the wet boom system based on pressure characteristics within the wet boom system, the method comprising:
        determining a pressure drop across each respective wet boom section of the wet boom system;
        detecting an upstream pressure value for each respective wet boom section with the upstream pressure sensor of the respective pair of the pressure sensors;
        detecting a downstream pressure value for each respective wet boom section with the downstream pressure sensor of the pair of the pressure sensors, wherein each respective pressure sensor of the pair of pressure sensors that is positioned between a pair of wet boom sections provides one of the pair of pressure sensors for each wet boom section of the respective pair of wet boom sections, wherein the respective pressure sensor positioned between the pair of wet boom sections provides a downstream pressure sensor for one of the pair of wet boom sections positioned on an upstream side of the respective pressure sensor, and wherein the respective pressure sensor provides an upstream pressure sensor for another of the pair of wet boom sections positioned on a downstream side of the respective pressure sensor;
        comparing the upstream and downstream pressure values of each respective wet boom section to provide a wet boom section pressure value for each respective wet boom section;
        evaluating each wet boom section pressure value with respect to an acceptable wet boom section pressure drop value to determine a compromised flow state or an acceptable flow state of each respective wet boom section; and
    generating and conveying a user alert upon a determined compromised flow state of each respective wet boom section of the multiple wet boom sections.

2. The method of claim 1, wherein the monitoring flow rate characteristics are performed during an implement use session so that the user alert provides in-use feedback indicative of the compromised flow state of the respective wet boom section during the implement use session.

3. The method of claim 2, wherein during the planting session,
    upon determining the compromised flow state of at least one wet boom section of the multiple boom sections, the at least one wet boom section defining a flow-compromised wet boom section and for the at least one flow-compromised wet boom section, the method further comprises:
        adjusting a section control valve associated with the at least one flow-compromised wet boom section to reduce a discrepancy between a wet boom pressure drop value and an acceptable wet boom section pressure drop value.

4. The method of claim 3, wherein the monitoring flow rate characteristics are performed during an initial liquid flow calibration procedure so that the user alert provides in-use feedback indicative of the compromised flow state of the at least one boom section during the initial liquid flow calibration procedure.

5. The method of claim 4, wherein during the initial liquid flow calibration procedure,
upon determining a compromised flow state of the at least one wet boom section, the method further comprises:
adjusting the section control valve associated with the flow-compromised wet boom section to reduce a discrepancy between the wet boom pressure drop value and the acceptable wet boom section pressure drop value.

6. The method of claim 1, wherein:
the monitoring flow rate characteristics are performed during an initial liquid flow calibration procedure, the method comprising:
identifying a lowest-flow nozzle assembly in each wet boom section of the multiple wet boom sections during the initial liquid flow calibration procedure; and for each wet boom section of the multiple wet boom sections, the method further comprises:
comparing a pressure drop valve of the lowest-flow nozzle assembly in each of the multiple wet boom sections to an acceptable pressure drop value to determine a compromised flow state or acceptable flow state of the lowest-flow nozzle assembly; and
when the lowest-flow nozzle assembly of the respective wet boom section defines the compromised flow state,
adjusting a section control valve associated with the respective wet boom section until the lowest-flow nozzle assembly defines the acceptable flow state.

7. The method of claim 1, wherein generating and conveying the alert further comprises:
conveying location information of a respective nozzle assembly experiencing an unacceptable flow error condition to the user.

8. The method of claim 1, wherein the monitoring of the flow rate characteristics includes monitoring each nozzle assembly of each wet boom section during an implement use session so that the alert provides in-use feedback indicative of an unacceptable flow error condition during the implement use session.

9. The method of claim 1, wherein the monitoring of the flow rate characteristics includes monitoring each nozzle assembly of each wet boom section during an initial liquid flow calibration procedure so that the alert corresponds to an in-use unacceptable flow error condition determined during the initial liquid flow calibration procedure.

\* \* \* \* \*